(12) United States Patent
Chiu et al.

(10) Patent No.: US 10,462,880 B2
(45) Date of Patent: Oct. 29, 2019

(54) INTELLIGENT LAMP GROUP

(71) Applicant: Beautiful Light Technology Corp., Chiayi (TW)

(72) Inventors: Shih-Ting Chiu, Chiayi (TW); Chien-Wen Chiu, Chiayi (TW); Chang-Hsin Chu, Tainan (TW)

(73) Assignee: Beautiful Light Technology Corp., Chiayi (TW)

( * ) Notice: Subject to any disclaimer, the term of this patent is extended or adjusted under 35 U.S.C. 154(b) by 284 days.

(21) Appl. No.: 15/484,116

(22) Filed: Apr. 10, 2017

(65) Prior Publication Data

US 2017/0295629 A1    Oct. 12, 2017

Related U.S. Application Data

(60) Provisional application No. 62/409,385, filed on Oct. 18, 2016.

(30) Foreign Application Priority Data

Apr. 12, 2016 (TW) .................................. 105205077
Nov. 15, 2016 (TW) .................................. 105217424

(51) Int. Cl.
   *F21K 9/238* (2016.01)
   *H05B 37/02* (2006.01)
   (Continued)

(52) U.S. Cl.
   CPC ......... *H05B 37/0272* (2013.01); *F21K 9/232* (2016.08); *F21K 9/235* (2016.08);
   (Continued)

(58) Field of Classification Search
   CPC ............ H05B 37/0272; H05B 37/0227; H05B 33/0854; H05B 37/0218; H04M 1/72533;
   (Continued)

(56) References Cited

U.S. PATENT DOCUMENTS

2011/0234078 A1    9/2011 Choi et al.
2015/0249777 A1*   9/2015 Chen .................... H04N 5/2257
                                                        348/151

(Continued)

FOREIGN PATENT DOCUMENTS

CN    201547532 U    8/2010
DE    202016102763 U1  10/2016
(Continued)

*Primary Examiner* — Joseph W Becker
(74) *Attorney, Agent, or Firm* — CKC & Partners Co., LLC (57) ABSTRACT

An intelligent lamp group includes a central lamp and at least one peripheral lamp. The central lamp includes a first lamp housing, a first light emitter, a first lampshade, a video camera module, an external memory and a system-on-chip. The first light emitter is disposed on the first lamp housing. The first lampshade covers the first light emitter. The video camera module is fixed in the first lampshade. The system-on-chip of the central lamp having a combo wireless communication module is configured to build a local wireless network to connect all the peripheral lamps, hence the user can only focus on the central lamp to achieve the remote control for the central lamp and all the peripheral lamps. In addition, through the combo wireless communication module, the central lamp can build an internet connection with the user's mobile device for the light remote control and the security monitoring.

9 Claims, 7 Drawing Sheets

(51) Int. Cl.
*F21K 9/68* (2016.01)
*F21K 9/235* (2016.01)
*F21K 9/237* (2016.01)
*F21V 3/02* (2006.01)
*G06K 9/00* (2006.01)
*H04M 1/725* (2006.01)
*H04N 5/225* (2006.01)
*H04N 7/18* (2006.01)
*H05B 33/08* (2006.01)
*F21V 33/00* (2006.01)
*F21S 2/00* (2016.01)
*F21V 23/04* (2006.01)
*F21K 9/232* (2016.01)
*H04W 4/80* (2018.01)
*F21Y 115/10* (2016.01)
*H04W 84/12* (2009.01)
*G08B 13/196* (2006.01)
*F21Y 103/33* (2016.01)
*F21K 9/66* (2016.01)
*G08B 25/10* (2006.01)

(52) U.S. Cl.
CPC .............. *F21K 9/237* (2016.08); *F21K 9/238* (2016.08); *F21K 9/68* (2016.08); *F21S 2/00* (2013.01); *F21V 3/02* (2013.01); *F21V 23/0478* (2013.01); *F21V 33/0052* (2013.01); *G06K 9/00771* (2013.01); *H04M 1/72533* (2013.01); *H04N 5/2257* (2013.01); *H04N 7/185* (2013.01); *H05B 33/0854* (2013.01); *H05B 37/0218* (2013.01); *H05B 37/0227* (2013.01); *F21K 9/66* (2016.08); *F21V 23/0464* (2013.01); *F21Y 2103/33* (2016.08); *F21Y 2115/10* (2016.08); *G08B 13/196* (2013.01); *G08B 25/10* (2013.01); *H04N 5/2256* (2013.01); *H04N 7/183* (2013.01); *H04W 4/80* (2018.02); *H04W 84/12* (2013.01); *Y02B 20/48* (2013.01)

(58) Field of Classification Search
CPC ........ G06K 9/00771; F21S 2/00; F21K 9/237; F21K 9/68; F21K 9/238; F21K 9/232; F21K 9/66; F21K 9/235; F21V 3/02; F21V 23/0464; F21V 23/0478; F21V 33/0052; H04N 7/185; H04N 5/2256; H04N 7/183; H04N 5/2257; Y02B 20/48; G08B 25/10; G08B 13/196; H04W 4/80; H04W 84/12; F21Y 2103/33; F21Y 2115/10

See application file for complete search history.

(56) References Cited

U.S. PATENT DOCUMENTS

| 2016/0100086 | A1* | 4/2016 | Chien | H04N 5/2256 348/143 |
| 2016/0195233 | A1* | 7/2016 | Lin | F21V 29/70 362/516 |
| 2016/0261824 | A1* | 9/2016 | Scalisi | H04N 7/142 |
| 2018/0249306 | A1* | 8/2018 | Pandharipande | H04Q 9/00 |

FOREIGN PATENT DOCUMENTS

| EP | 2843294 A1 | 3/2015 |
| EP | 3118513 A1 | 1/2017 |
| KR | 20150007935 A | 1/2015 |
| WO | 2015135223 A1 | 9/2015 |

* cited by examiner

601 — set a predetermined value of ambient light intensity to the first system-on-chip in central lamp 602 — Capture the ambient light intensity by using the video camera module 603 — compare the captured value with the predetermined value 604 — the first system-on-chip of central lamp outputs a light control signal to adjust the light output of central lamp and peripheral lamp

INTELLIGENT LAMP GROUP

RELATED APPLICATIONS

This application claims priority to Taiwan Application Serial Number 105205077, filed on Apr. 12, 2016, U.S. Provisional Application Ser. No. 62/409,385, filed on Oct. 18, 2016, and Taiwan Application Serial Number 105217424, filed on Nov. 15, 2016. The entire contents of each of which are incorporated by reference.

BACKGROUND

Field of Invention

The present invention relates to a light-emitting diode lamp group. More particularly, the present invention relates to a networked lighting-emitting diode lamp group.

Description of Related Art

Energy saving and environment protection bursted the light-emitting diode applications for lighting system in last decade. Lighting system design concentrated the luminous efficacy and illumination quality in this stage. Recently, based on the rapid progress in the field of Internet-Of-Things (IOT), the smart subject becomes one of the latest development trends for lighting technology. For example, App of smartphone could be used to make a wireless connection to a lighting system, dimming remotely the color temperature and output intensity. Combining with the smart technology, innovation of lighting technology could further focus on improving the quality of life. Moreover, safety and security become an important requirement for smart lighting technology.

SUMMARY

One object of the present invention is to provide a wireless network of light-emitting-diode (LED) lamps integrating a security monitoring function.

According to the aforementioned object, an intelligent lamp group is provided. The intelligent lamp group includes a central lamp and at least one peripheral lamp. The central one includes a first lamp housing, a first light emitter, a first lampshade, a video camera module and a first system-on-chip (SOC) with central processor unit, memory and wireless communication capability. The first light emitter is disposed on the first lamp housing. The first lampshade is disposed on the first lamp housing and covers the first light emitter, in which the first lampshade has an opening. The video camera module is mounted on the first lampshade and is located in the opening. The first system-on-chip is electrically connected to the first light emitter and the video camera module, in which the first system-on-chip is configured to control the first light emitter and to process the image signal captured by the video camera module. Furthermore, the first system-on-chip includes a combo wireless communication module with Bluetooth and Wi-Fi functions, where the Bluetooth one serves as a central role to link all peripheral lamps with the central one, forming a wireless network with low power dissipation, to transmit light dimming signals to all peripheral lamps. In addition, the central lamp can provide a server function for user's mobile device, such as a smartphone or a tablet, via the Bluetooth connection to accept and perform user's requirements, for example, turning on/off or dimming all the light emitters in the network. The users do not need to perform a tedious task, setting the initial connectivity for all lamps at the first use, instead, they only concentrate on the central lamp and feel that the entire lamp system is one device. As regards the Wi-Fi function, the central lamp can make a wireless connection with, for example a domestic access point (AP) device, hence the users' mobile device can remotely control the entire lamp system and display the streaming video captured by the video camera module via internet. The peripheral lamp includes a second lamp housing, a second light emitter, a second lampshade and a second system-on-chip with Bluetooth function. The second light emitter is disposed on the second lamp housing. The second lampshade is disposed on the second lamp housing and covers the second light source module. The second system-on-chip with Bluetooth function serves as a peripheral role to receive the light dimming signal from the central lamp and then delivery a control signal to the second light emitter.

According to an embodiment of the present invention, the central lamp further includes a reflector disposed on an outer side of the first light emitter. The reflector has a concave surface which is used to reflect part of the light generated by the first light emitter towards a region in front of the video camera module, preventing the shadow phenomenon caused by the video camera module.

According to an embodiment of the present invention, the central lamp further includes a reflector disposed on an inner side of the first light source module. The reflector has a convex surface which is used to reflect part of the light generated by the first light emitter towards the outside region of first lampshade.

According to an embodiment of the present invention, the central lamp further includes a frustum support disposed on the first lampshade to sustain the video camera module and located at the inner side of the first light emitter. The frustum support has a concave surface of high optical reflectivity, which can reflect part of the light generated by the first light emitter towards the wide angle region of the first lampshade. In addition, the frustum support is used to separate the video camera module from the first light emitter and the first system-on-chip, preventing the generated heat from degrading the image quality of video camera.

According to an embodiment of the present invention, the ambient light parameters such as intensity and color temperature can be evaluated from the detected information of the video camera module and then processed in the first system-on-chip to obtain a control signal for dimming all the system lamps to a desired condition. As mentioned above, the dimming signal can be transmitted through the Bluetooth network. Combing the functions of video camera and system-on-chip enables a smart adaptive light dimming.

According to an embodiment of the present invention, the central lamp further includes a first lamp base cap disposed, on a bottom end of the first lamp housing, and the first lamp base cap is connected to a first rectifying circuit which transforms the AC electricity into the DC one supplying the first light emitter, the first system-on-chip and the video camera module. The peripheral lamp further includes a second lamp base cap disposed on a bottom end of the second lamp housing, and the second lamp base cap is connected to a second rectifying circuit which transforms the AC electricity into the DC one supplying the second light emitter and the second system-on-chip.

According to an embodiment of the present invention, the central lamp further includes a frustum support having an antenna opening, which enables a better wireless signal transmission for the combo wireless communication module in the first system-on-chip.

According to an embodiment of the present invention, in which the first lamp housing includes a first casing, a second casing and a translucent shell. The first casing has an accommodating space. The second casing is put around the first casing, in which a side light emitter is disposed on an outer surface of the second casing. The translucent shell covers the side light emitter disposed on the second casing.

According to an embodiment of the present invention, the second lamp housing includes a first casing, a second casing and a translucent shell. The first casing has an accommodating space. The second casing is put around the first casing, in which a side light emitter is disposed on an outer surface of the second casing. The translucent shell covers the side light emitter disposed on the second casing.

According to the aforementioned embodiments of the present invention, the intelligent lamp configuration of the present invention includes a central lamp and at least one peripheral lamp without video camera module and Wi-Fi module, structure of the peripheral lamp is much simpler than that of the central lamp, thus reducing the entire system expense. For the sake of easier operation, the users should prefer handling only one lamp rather than all individual lamps. This one lamp, named as central lamp, should possess the capability of local and internet communication with the users' smartphone or tablet, hence a combo type wireless module is employed in the system-on-chip. The central lamp further needs a security monitoring function using a fish-eye camera capable of watching a wide range of space. A peripheral lamp should broadcast through the Bluetooth module in the system-on-chip and wait for the connection built by the central lamp. Moreover, only the central lamp has the internet function, and the periphery lamps receive the controlling signal transmitted from the central lamp via the Bluetooth network, so that the entire lamp system occupies only one channel of Wi-Fi AP device. Furthermore, the low-power mode of Bluetooth operation, including sleep and deep-sleep mode which could reduce the potential possibility of human health risk caused by electromagnetic fields.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
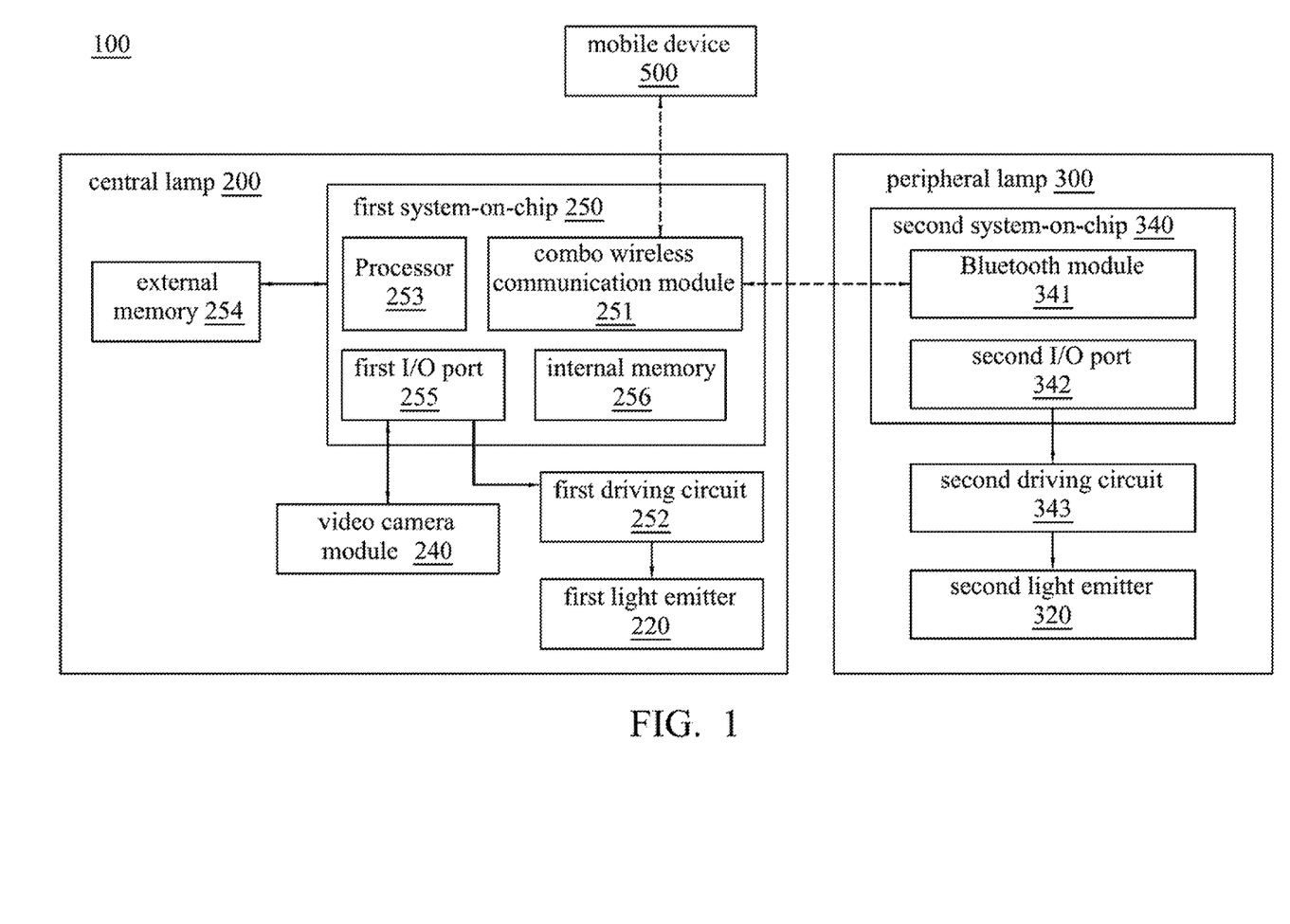
FIG. 1 is a schematic diagram showing an intelligent lamp group in accordance with an embodiment of the present invention.

Referring to FIG. 1, FIG. 1 is a schematic diagram showing an intelligent lamp group 100 in accordance with an embodiment of the present invention. The intelligent lamp group 100 mainly includes a central lamp 200 and at least one peripheral lamp 300. The central lamp 200 mainly includes a first system-on-chip 250, an external memory 254, a first driving circuit 252, a first light emitter 220 and a video camera module 240. The first system-on-chip 250 can process user's requirement from a wireless connection and then send out a corresponding control signal to the first driving circuit 252. The first driving circuit 252 transforms the control signal into the drive current for the first light emitter 220. In addition, the first system-on-chip 250 can process the image signal captured by the video camera module 240 and then stores the processed streaming video in the external memory 254 or transmits the streaming video. A user's mobile device 500, such as a smartphone or a tablet, can build an internet connection to the first system-on-chip 250 via an access point (AP) device and display the streaming video for user. Meanwhile, the user can remotely control the first light emitter 220 through the same internet connection. The peripheral lamp 300 mainly includes a second system-on-chip 340, a second driving circuit 343 and a second light emitter 320. The second system-on-chip 340 can process the control signal transmitted from the first system-on-chip 250 and then send out a corresponding control signal to the second driving circuit 343 through the second system-on-chip 340. The second driving circuit 343 transforms the control signal into the drive current for the second light emitter 320. Hence, the first system-on-chip 250 can control the first light emitter 220 and the second light emitter 320 through direct connection and wireless connection respectively. That implies the central lamp 200 can receive the user's requirement and then control all the peripheral lamps of entire system. The user's mobile device 500 always connects the central lamp 200 only, thus greatly reduce the complexity of operation and initial setting.

Figure 2:
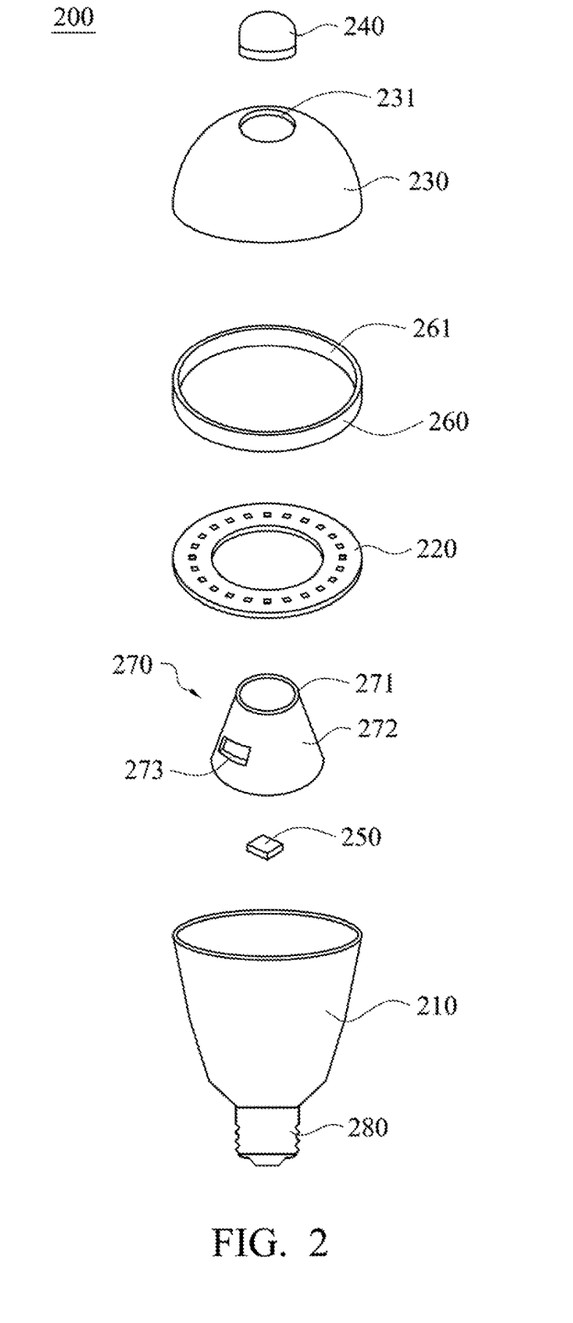
FIG. 2 is a structure-exploded diagram showing a central lamp in accordance with an embodiment of the present invention.
Figure 3:
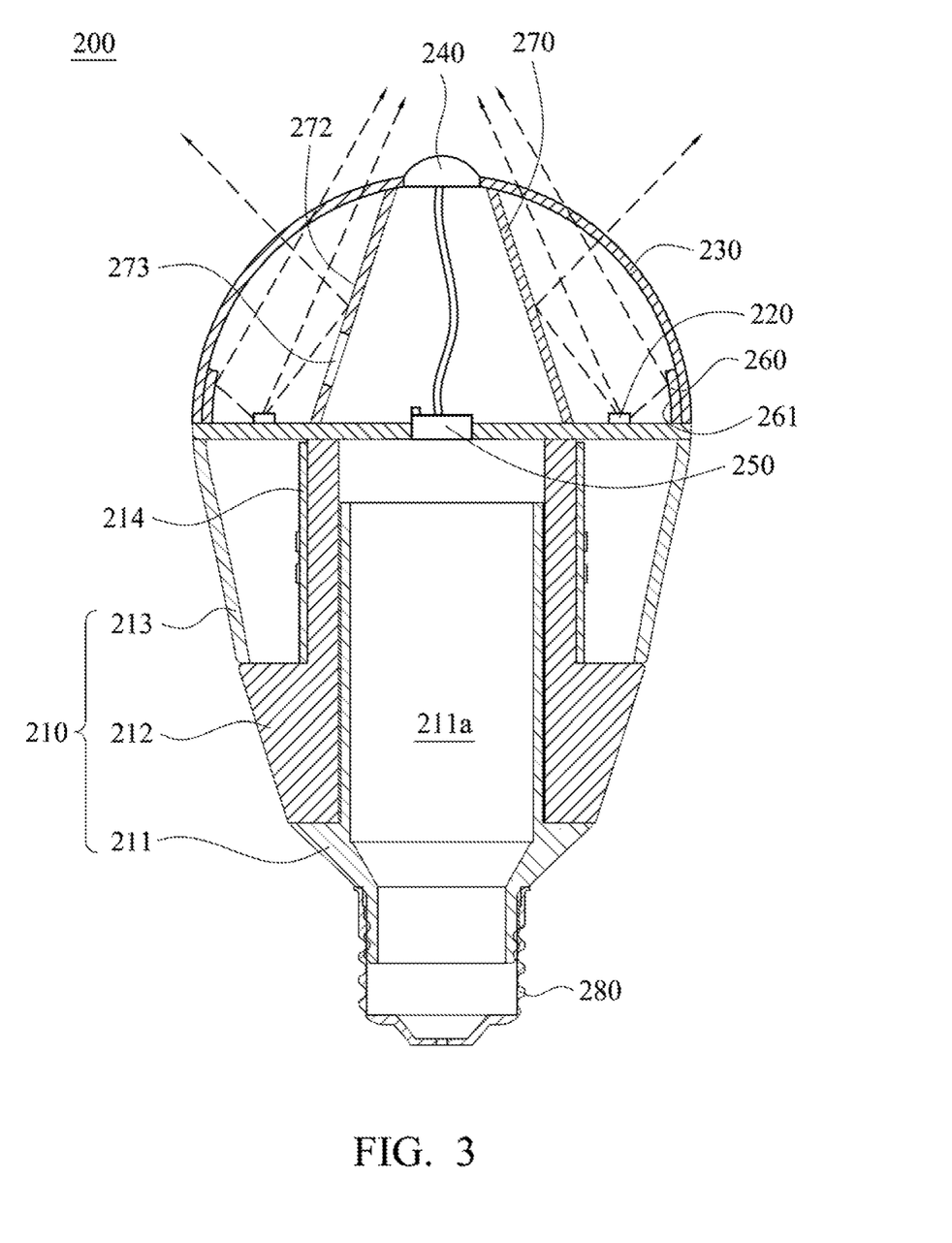
FIG. 3 is a schematic cross-sectional view showing the central lamp in accordance with an embodiment of the present invention.

Simultaneously referring to FIG. 2 and FIG. 3, FIG. 2 is a structure-exploded diagram showing the central lamp 200 in accordance with an embodiment of the present invention, and FIG. 3 is a schematic cross-sectional view showing the central lamp 200 in accordance with an embodiment of the present invention. The central lamp 200 of the present embodiment includes a first lamp housing 210, the first light emitter 220, a first lampshade 230, the video camera module 240, the first system-on-chip 250, a reflector 260, a frustum support 270 and a first base cap 280. The first light emitter 220, the first system-on-chip 250, the reflector 260 and the frustum support 270 are disposed on the first lamp housing 210. The first lampshade 230 is disposed on a top end of the first lamp housing 210, the video camera module 240 is disposed on the first lampshade 230, and the first base cap 280 is disposed on a bottom end of the first lamp housing 210. Therefore, the first lampshade 230, the first lamp housing 210 and the first base cap 280 are combined to form a shape of a typical bulb. The first base cap 280 can be screwed into a light bulb socket to conduct the AC electricity supply.

Referring to FIG. 2 and FIG. 3 again, the first lampshade 230 has an opening 231. The video camera module 240 is fixed onto the opening 231 of the first lampshade 230. The frustum support 270 is disposed on the first lamp housing 210 and is located in the first lampshade 230. In the present embodiment, a top surface 271 of the frustum support 270 faces towards the opening 231 of the first lampshade 230, and the video camera module 240 is disposed on the top surface 271 of the frustum support 270. As shown in FIG. 2 and FIG. 3, the first light emitter 220 is a ring-type structure, and the first light emitter 220 is disposed on the first lamp housing 210 and surrounds the frustum support 270. In the present embodiment, an outer surface 272 of the frustum support 270 facing towards the first light emitter 220 is a highly reflective surface, so that part of light generated from the first light emitter 220 can be reflected by the outer surface 272 to wide-angle region of the first lampshade 230.

Referring to FIG. 2 and FIG. 3 again, the reflector 260 is a ring-type structure, and the reflector 260 is disposed on the first lamp housing 210 and surrounds the first light emitter 220. In the present embodiment, the reflector 260 has a concave surface 261, and the concave surface 261 faces towards the first light emitter 220. Therefore, the concave surface 261 can reflect part of the light generated from the first light emitter 220 to the region in front of the video camera module 240, so as to prevent the shadow phenomenon caused by the video camera module 240 and to make up the insufficient light intensity distribution caused by the screening effect of the frustum support 270 and the video camera module 240. In some embodiments, the concave surface 261 is a concave curved surface or a concave inclined surface, in which the curvature of the concave surface or the slope of the concave inclined surface can be designed to modulate the light intensity distribution curve according to the dimension parameters of the first light emitter 220 and the frustum support 270.

Figure 4:
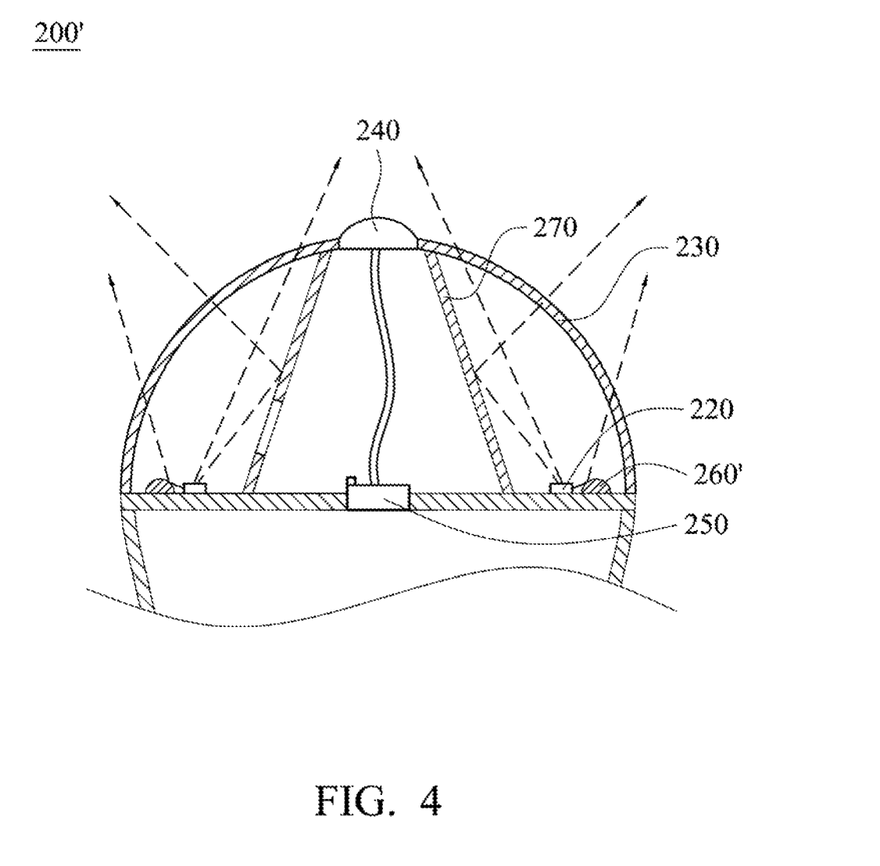
FIG. 4 is a partial cross-sectional view showing a central lamp in accordance with another embodiment of the present invention.

It should be mentioned, the reflector 260 with a concave surface as shown in FIG. 3 is merely used as an example for explanation, and the reflector in other embodiments may have different design. Referring to FIG. 4, FIG. 4 is a partial cross-sectional view showing a central lamp 200' in accordance with another embodiment of the present invention. As shown on FIG. 4, a reflector 260' of the central lamp 200' exhibits a convex surface to widen the light distribution. It implies that the surface curvatures of both the frustum support 270 and the reflector 260 can be used to modulate the light distribution curve for the central lamp 200'.

Referring to FIG. 2 and FIG. 3 again, the first system-on-chip 250 is disposed on the first lamp housing 210 and is electrically connected to the first light emitter 220 and the video camera module 240. The first system-on-chip 250 can modulate the light output of the first light emitter 220 and process the image or video data captured by the video camera module 240. In the present embodiment, the first system-on-chip 250 is separated from the video camera module 240 at a distance so as to prevent the video camera module 240 from the heat generated from the first light emitter 220 and the first system-on-chip 250. In one example, the first system-on-chip 250 can be electrically connected to the video camera module 240 by wires. In other embodiments, the first system-on-chip 250 is disposed on the first lamp housing 210 and is located in the frustum support 270. The wireless communication signal for the first system-on-chip 250 can be transmitted or received through the frustum support 270 via an antenna opening 273 disposed on the sidewall of the frustum support 270. Therefore, by disposing the video camera module 240 on the top surface of the frustum support 270, by disposing the first system-on-chip 250 inside the frustum support 270, and by using the first light emitter 220 to surround the frustum support 270, the video camera module 240 can be spatially separated from the first light emitter 220 and the system-on-chip 250, so as to prevent the image quality captured by the video camera module 240 from being degraded due to the heat generated from the first light emitter 220 or the first system-on-chip 250.

As shown in FIG. 3, the first lamp housing 210 of the present embodiment includes a first casing 211, a second casing 212 and a translucent shell 213. The first casing 211 has an accommodating space 211a which can be used to accommodate the first system-on-chip 250, a rectifying circuit or an external storage unit, such as flash memory. The second casing 212 is put around the first casing 211, and a side light emitter 214 is disposed on an outer surface of the second casing 212. The translucent shell 213 covers the side light emitter 214 located on the second casing 212, so that light generated from the side light emitter 214 can pass through the translucent shell 213. In one example, the second casing 212 can be a metal material, so that the heat generated from the side light emitter 214 can be conducted by the second casing 212 and further dissipated to the external atmosphere. It should be mentioned that, the structure of the first lamp housing 210 can be designed according to different requirements and is not limited to the structure as shown in FIG. 3.

Referring to FIG. 1 and FIG. 3, the first system-on-chip 250 includes a processor 253, a combo wireless communication module 251, a first I/O port 255 and an internal memory 256. The combo wireless communication module 251 possesses both the Wi-Fi and Bluetooth wireless communication functions. A user's mobile device 500 can built a local wireless connection with the combo wireless communication module 251 by using its Bluetooth function. App installed in the mobile device 500 allows the user send a light tuning command to the first system-on-chip 250 through the combo wireless communication module 251. A software stored in the internal memory 256 can be executed by the processor 253 to process the user's requirement, for example, tuning the light intensity and color temperature, and to output a digital control signal through the first I/O port 255 to the first driving circuit 252. Then, the first driving circuit 252 can transfer the digital control signal into the drive current for the first light emitter 220 to complete the light tuning requirement from user. If the user is far from the central lamp 200, the user's mobile device 500 can build an internet connection with the first system-on-chip 250 through the Access Point device. The internet connection employs the Wi-Fi function of the combo wireless communication module 251 in the first system-on-chip 250. With the internet connection, the user also can tune the light intensity and color temperature for the central lamp 200. Furthermore, the first system-on-chip 250 can process the video information captured by the video camera module 240 and transmit the streaming video to user's mobile device 500 by using the internet connection. It should be mentioned that the user's requirement, for example, tuning the light parameters, such as light intensity and color temperature, can be transferred to the peripheral lamp 300 through the Bluetooth connection built between the central lamp 200 and the peripheral lamp 300.

Figure 5:
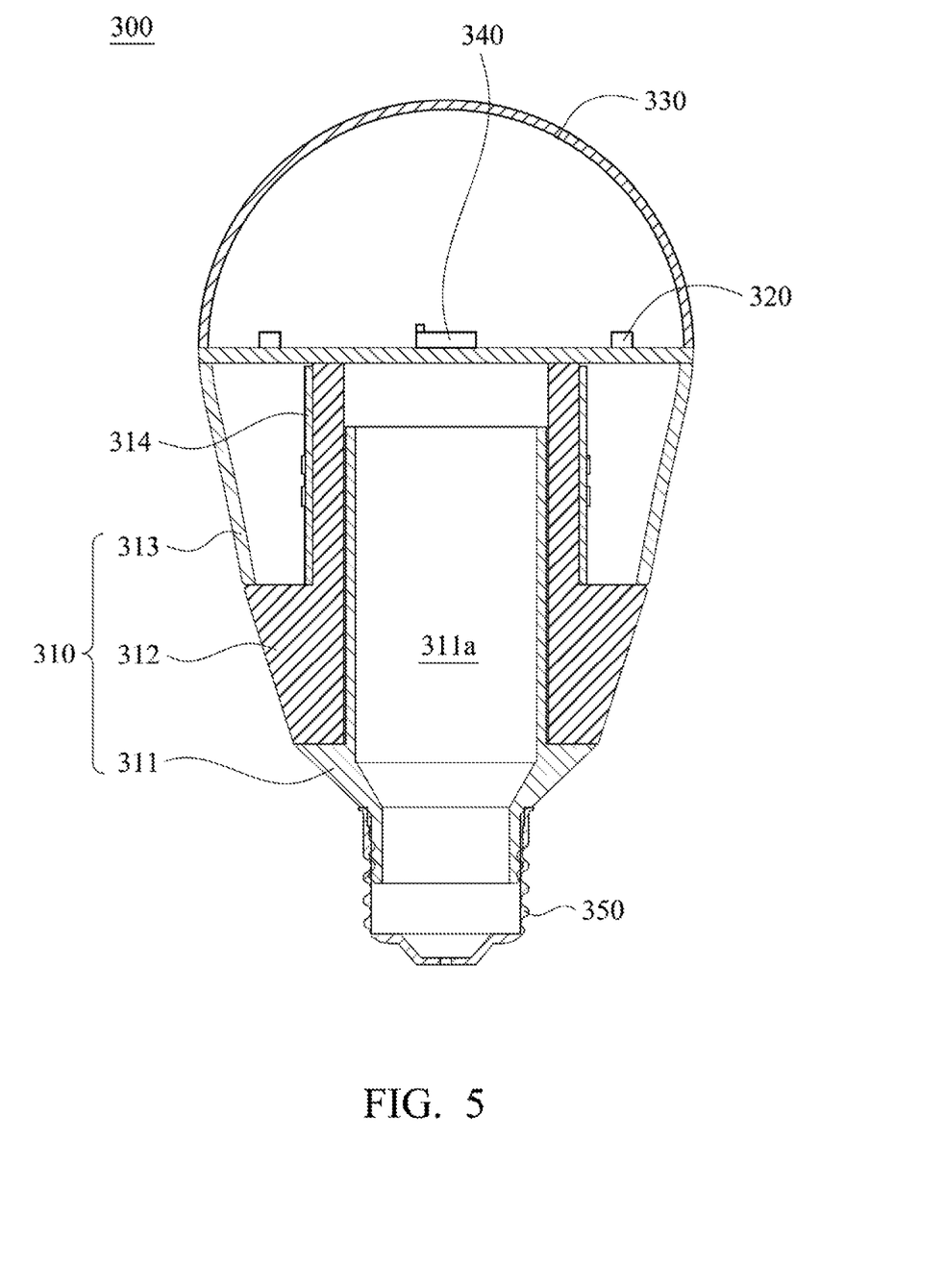
FIG. 5 is a schematic cross-sectional view showing a peripheral lamp in accordance with an embodiment of the present invention.

Referring to FIG. 1 and FIG. 5, FIG. 5 is schematic cross-sectional view showing the peripheral lamp 300 in accordance with an embodiment of the present invention. In the present embodiment, the peripheral lamp 300 includes a second lamp housing 310, the second light emitter 320, a second lampshade 330, the second system-on-chip 340 and a second base cap 350. The second light emitter 320 and the second system-on-chip 340 are fixed on the second lamp housing 310. The second lampshade 330 is disposed on a top end of the second lamp housing 310, and second base cap 350 is disposed on a bottom end of the second lamp housing 310. Therefore, the second lampshade 330, the second lamp housing 310 and the second base cap 350 are combined to form a shape of a typical bulb. The second base cap 350 can be screwed into a light bulb socket to conduct the AC electricity to a rectifying circuit.

Simultaneously referring to FIG. 1 and FIG. 5, the second system-on-chip 340 includes a bluetooth module 341 and a second I/O port 342. The bluetooth module 341 is mainly used to build a wireless connection with the central lamp 200, receiving the light control signal transmitted from the central lamp 200. The second system-on-chip 340 can process the control signal transmitted from the first system-on-chip 250 and then send out a corresponding control signal to the second driving circuit 343 through the second I/O port 342. As shown in FIG. 5, the second lamp housing 310 includes a first casing 311, a second casing 312 and a translucent shell 313. The first casing 311 has an accommodating space 311a which is used to accommodate a rectifying circuit or other required elements. The second casing 312 is put around the first casing 311, and a side light emitter 314 is disposed on an outer surface of the second casing 312. The translucent shell 313 covers the side light emitter 314 located on the second casing 312, so that light generated from the side light emitter 314 can pass through and emit from the translucent shell 313. In one example, the second casing 312 can be a metal material, so that the heat generated from the side light emitter 314 can be conducted to the second casing 312 and further dissipated to the external atmosphere. It should be mentioned that, the structure of the second lamp housing 310 can be designed according to meet different requirements and is not limited to the structure as shown in FIG. 5.

Figure 6:
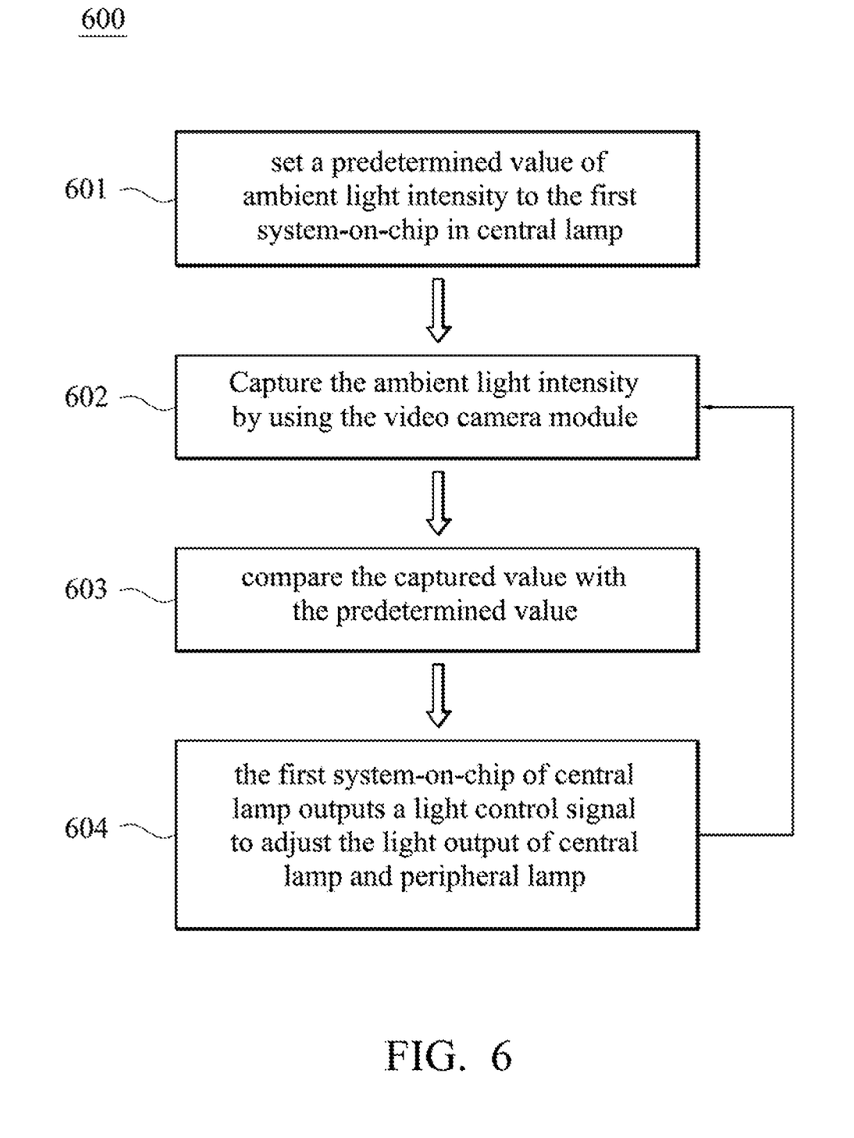
FIG. 6 is a flow chart showing an adaptive light dimming process of the intelligent lamp group in accordance with an embodiment of the present invention.

Procedure of adaptive light diming for the intelligent lamp group 100 of the present invention is described below. Simultaneously referring to FIG. 1 and FIG. 6, FIG. 6 is a flow chart showing an adaptive light dimming process of the intelligent lamp group in accordance with an embodiment of the present invention. In the adaptive light dimming procedure, a step 601 is performed to set a predetermined value of ambient light intensity level by using the mobile device 500. Thereafter, a step 602 is performed to capture the ambient light intensity level of environment by using the video camera module 240 and to evaluate the intensity level of environment. Then, a step 603 is performed to compare the predetermined value of light intensity with the captured value. At last, a step 604 is performed to adjust the output light intensity or the color temperature of entire lamp system of the intelligent lamp group 100. In the step 604, a digital control signal is decided and output by the first system-on-chip 250. The digital control signal generated from the first system-on-chip 250 is transferred internally to the first driving circuit 252 and externally to the second driving circuit 343 via the Bluetooth connection between the first system-on-chip 250 and the second system-on-chip 340. Iterate the step 602, 603 and 604 till the difference between the predetermined value and the captured value is negligible.

Figure 7:
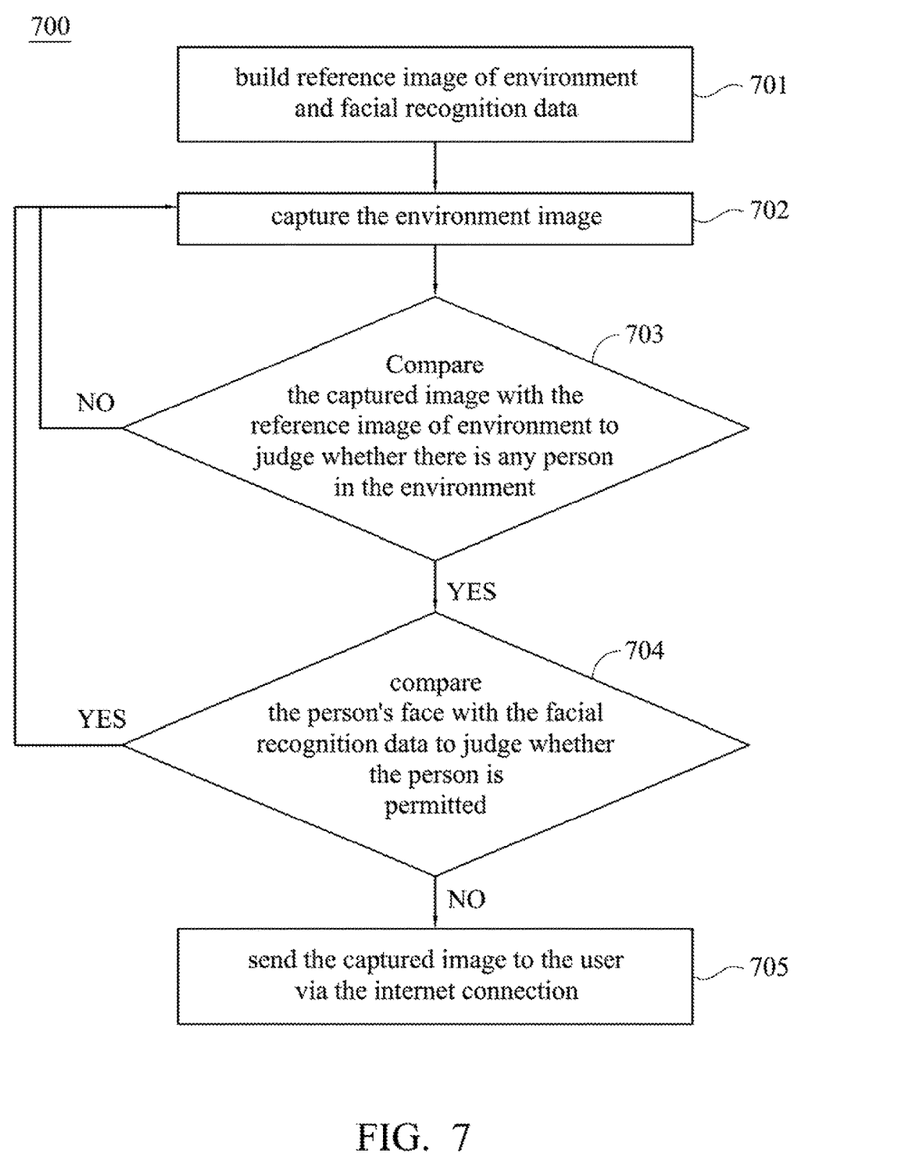
FIG. 7 is a flow chart showing a security monitoring process of the intelligent lamp group in accordance with an embodiment of the present invention.

Referring to FIG. 1 and FIG. 7, FIG. 7 is a flow chart showing a security monitoring process 700 of the intelligent lamp group 100 in accordance with embodiment of the present invention. In the security monitoring process 700, a step 701 is first performed to build a reference image of environment and facial recognition data of permitted persons by the central lamp 200, in which the build reference image of environment and the facial recognition data are stored in the external memory unit 254 of the central lamp 200. Thereafter, a step 702 is performed to capture the environment image by using the video camera module 240 in the central lamp. Then, a step 703 is performed to compare the captured image with the reference image of environment to judge whether there is any person existing in the environment. If the judgement is true, step 704 is performed to determine whether the person's face matches the facial recognition data. If the judgement is false, implying that the person's face does not match the facial recognition data, a step 705 is performed to send the captured images to the user's mobile device 500 through the internet connections.

According to the aforementioned embodiments of the present invention, the intelligent lamp group of the present invention includes a central lamp and at least one peripheral lamp. The central lamp 200 can receive the user's requirement and then control all the peripheral lamps of entire system. The user's mobile device always connects the central lamp only, thus greatly reduce the complexity of operation and initial setting.

In addition, the central lamp can use the video camera module to capture the ambient light intensity and the color temperature and then adaptively adjust the light output of entire lamp system, including the central lamp and the at least one peripheral lamp, to approach the user's requirement for the environment light intensity and color temperature. Moreover, the central lamp of the present invention also can be used to build a facial recognition database, capture the human face image and compare the captured face image with the database, so as to send warning information and live images to the user.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An intelligent lamp group, comprising:
   a central lamp, comprising:
      a first lamp housing;
      a first light emitter disposed on the first lamp housing;
      a first lampshade disposed on the first lamp housing and covering the first light emitter, wherein the first lampshade has an opening;
      a video camera module fixed on the first lampshade and located in the opening;
      a first system-on-chip configured to control the first light emitter and process images or video information captured by the video camera module, wherein the first system-on-chip comprises a combo wireless communication module which is configured to build a wireless Bluetooth network to transmit a light control signal and to build an internet connection with a user's mobile device; and a frustum support disposed in the first lampshade and located at an outer side of the first light emitter, wherein the frustum support has a reflective surface facing towards the first light emitter, and the reflective surface is used to reflect part of light generated by the first light emitter towards an outer side of the first lampshade, and the frustum support is used to separate the video camera module from the first light emitter and the first system-on-chip; and at least one peripheral lamp wirelessly connected to the central lamp, wherein the peripheral lamp comprises:
a second lamp housing;
a second light emitter disposed on the second lamp housing;
a second lampshade disposed on the second lamp housing and covering the second light emitter; and
a second system-on-chip with Bluetooth function configured to receive the light control signal which is delivered from the combo wireless communication module.

2. The intelligent lamp group of claim 1, wherein the central lamp further comprises a reflector disposed on an outer side of the first light emitter, and the reflector has a concave surface which is used to reflect part of light generated by the first light emitter towards a region in front of the video camera module.

3. The intelligent lamp group of claim 1, wherein the central lamp further comprises a reflector disposed on an outer side of the first light emitter, and the reflector has a convex surface which is used to reflect part of light generated by the first light emitter towards outside of first lampshade.

4. The intelligent lamp group of claim 1, wherein the video camera module is configured to capture ambient light parameters, and the ambient light parameters will be processed by the first system-on-chip to generate a complementary light control signal which is transmitted to the at least one peripheral lamp via the wireless Bluetooth network between the combo wireless communication module and the second system-on-chip to adjust the light output of the central lamp and the at least one peripheral lamp.

5. The intelligent lamp group of claim 1, wherein
the combo wireless communication module in the first system-on-chip is configured to receive an user's requirements from the user's mobile device and to transmit a streaming video or an image picture to the user's mobile device, wherein the combo wireless communication module can build a local wireless network between the central lamp and the at least one peripheral lamp; and
the first system-on-chip further comprises:
a processor configured to generate the light control signal according to the user's requirement and to process the signal captured by the video camera module to obtain the streaming video or the image picture;
an internal memory storing the software executed by the processor to handle all the functions of the first system-on-chip; and
an I/O port connected to a driving circuit of the central lamp and the video camera module, wherein the I/O port is configured to send the light control signal to the driving circuit and receive the captured image signal from the video camera module.

6. The intelligent lamp group of claim 1, wherein
the central lamp further comprises a first base cap disposed on a bottom end of the first lamp housing, and the first base cap is electrically connected to a first rectifying circuit which converts the AC electricity to the DC for supplying the first system-on-chip, the first light emitter and the video camera module; and
the peripheral lamp further comprises a second base cap disposed on a bottom end of the second lamp housing, and the second base cap is electrically connected to a second rectifying circuit which converts the AC electricity to the DC for supplying the second system-on-chip and the second light emitter.

7. The intelligent lamp group of claim 1, wherein the central lamp further comprises a frustum support disposed in the first lampshade, wherein the first system-on-chip is disposed in the frustum support, and a sidewall of the frustum support has an antenna opening.

8. The intelligent lamp group of claim 1, wherein the first lamp housing comprises:
a first casing having an accommodating space;
a second casing put around the first casing, wherein a side light emitter is disposed on an outer surface of the second casing; and
a translucent shell covering the side light emitter disposed on the second casing.

9. The intelligent lamp group of claim 1, wherein the second lamp housing comprises:
a first casing having an accommodating space;
a second casing put around the first casing, wherein a side light emitter is disposed on an outer surface of the second casing; and
a translucent shell covering the side light emitter disposed on the second casing.

* * * * *